United States Patent [19]
Klug

[11] Patent Number: 5,161,580
[45] Date of Patent: Nov. 10, 1992

[54] CABLE DUCT FITTING WITH REMOVABLE COVER

[75] Inventor: Christopher J. Klug, West Allis, Wis.

[73] Assignee: Tyton Corporation, Milwaukee, Wis.

[21] Appl. No.: 573,499

[22] Filed: Aug. 27, 1990

[51] Int. Cl.5 .............................................. F16L 9/00
[52] U.S. Cl. ...................................... 138/92; 138/157; 138/162; 138/164; 174/68.3; 174/101
[58] Field of Search ............... 138/156, 157, 158, 163, 138/164, 169, 167, 92, 128, 151, 162; 174/97, 68.3, 101; 428/100

[56] References Cited

U.S. PATENT DOCUMENTS

| 630,386 | 8/1899 | Mather | 138/157 |
|---|---|---|---|
| 722,396 | 3/1903 | Beach | 138/157 |
| 1,756,023 | 4/1930 | Felsenthal | 138/157 |
| 1,817,034 | 8/1931 | Hotchkin | 174/101 |
| 1,859,864 | 5/1932 | Christie | 138/157 |
| 2,333,026 | 10/1943 | McDonough | 138/158 |
| 3,101,097 | 8/1963 | Murray | 138/92 |
| 3,242,576 | 3/1966 | Wheeler | 138/157 |
| 3,351,699 | 11/1967 | Merckle | 138/157 |
| 3,530,627 | 9/1970 | Carter et al. | 174/101 |
| 3,566,566 | 3/1971 | Janic | 138/92 |
| 3,941,159 | 3/1976 | Toll | 138/147 |
| 4,105,051 | 8/1978 | Visentin | 138/157 |
| 4,142,565 | 3/1979 | Plunkett | 138/149 |
| 4,269,231 | 5/1981 | Harper | 138/92 |
| 4,433,732 | 2/1984 | Licht et al. | 138/92 |

FOREIGN PATENT DOCUMENTS

| 805785 | 5/1951 | Fed. Rep. of Germany | 138/92 |
|---|---|---|---|
| 2593973 | 4/1987 | France | 174/101 |

OTHER PUBLICATIONS

Tyton Corporation, 1988-1989 Product Line Catalog, pp. 28-34, 36-37.

Primary Examiner—James E. Bryant, III
Attorney, Agent, or Firm—Michael, Best & Friedrich

[57] ABSTRACT

An enclosure for housing a cable, the enclosure having a removable cover and, when removed, an opening is defined into the interior of the enclosure. Flanges extend inwardly of the enclosure and are located at the opening. The flanges are supported in recesses in the walls defining the enclosure and the flanges, in turn, include recesses in which fasteners for releasably securing the cover to the enclosure are supported. The connecting flanges of the predominant walls which are used in connecting multiple wall sections to form the enclosure are turned inwardly.

3 Claims, 2 Drawing Sheets

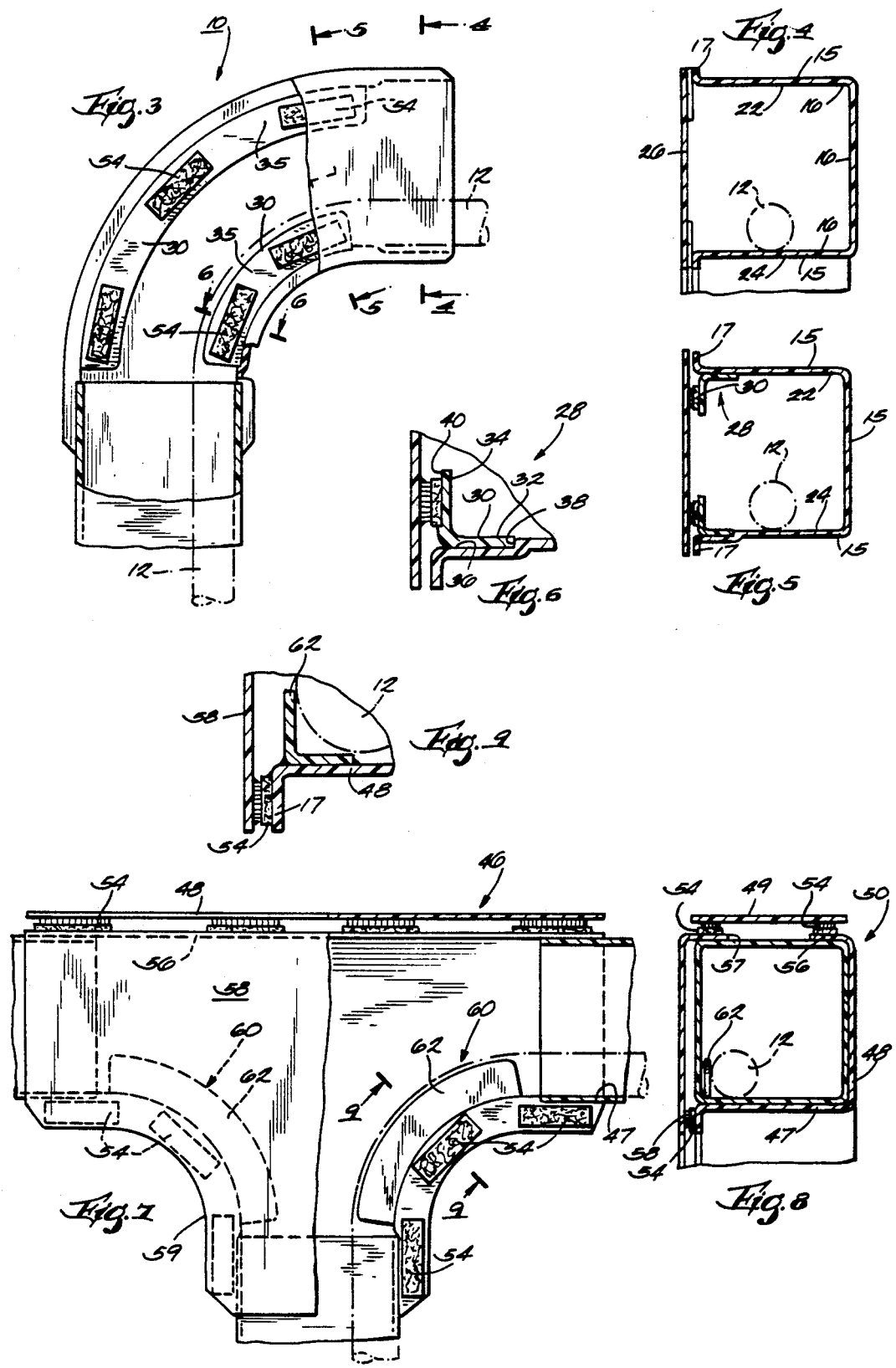

CABLE DUCT FITTING WITH REMOVABLE COVER

BACKGROUND OF THE INVENTION

1. Technical Field

This invention relates generally to ducting for cables and the like.

2. Relation to the Prior Art

This invention may have general application to duct work for carrying various types of lines and/or cable. It will be discussed in connection with telecommunication networks for convenience and because that may be one of its major applications.

Known telecommunications networks often include bundles of electrical or fiber optic cables. In order to route the cables to form the network, and to provide protection for the cables, it is generally known to provide a duct to guide and house the cable bundles. Because of the various curved and cornered paths which the cables may have to follow, the associated ducting must also have cornered and curved configurations. Provision of the ducts also helps to prevent accidental cutting and kinking of the cable, and help to prevent associated signal loss. Also, because a network of cables may require a bundle of cables to be split at a junction to follow multiple paths, the ducting may include various configurations of T-fittings and four-way cross connectors.

To facilitate installation, and maintenance, of a cable network, it is also generally known to provide the ducting with removable covers. Installation of the network is eased by first installing the ducts, and then removing the associated cover from the duct. The cabling can then be laid into the ducts and the covers replaced on the ducts to enclose the cabling. The provision of removable covers also eases access to the cables to facilitate maintenance of the cables, and permits a greater fill capacity of the ducts.

One of the problems associated with such ducting is that, when the covers from the duct work are removed, the cables housed by the ducts can become dislocated or fall out of the ducts due, for example, to tension in the bundles of cables which might be wrapped around corners and curves and due to gravity. Where the ducting includes a vertically oriented T-fitting, for example, the cabling can be especially susceptible to accidental dislocation from the duct when the cover is removed. A fall from the duct can result in a kink or cut in the cabling with attendant loss of the signal carried by the cable.

The wiring, and thus the ducting for the wires, is often used in cramped spaces. Therefore, the duct construction should be compact to extend its use in such spaces and, as much as possible, free of laterally, or outwardly projecting flanges.

Another problem associated with known ducting is that removal of the covers from the associated duct can loosen the fasteners for securing the cover to the duct, thereby introducing the danger of a cover inadvertently separating from the ducting and requiring greater maintenance of the communications network.

SUMMARY OF THE INVENTION

In view of the foregoing, it is a general object of this invention to provide an enclosure adapted to house and protect a cable.

It is a more specific object of this invention to provide a protective enclosure for a cable which enclosure affords relatively easy access to the cable.

It is another more specific object of this invention to provide an enclosure having a removable cover and means requiring low maintenance for releasably and securely fastening the cover to the enclosure.

Another specific object of this invention is to provide a compact, space efficient construction.

It is also a specific object of this invention to provide a duct which has a removable cover, is adapted to house a cable, and includes means for retaining the cable inside the duct when the cover is removed.

For the accomplishment of these and other objects, this invention provides an enclosure including a channel defined by connected sidewalls and a removable cover adapted to fit on the sidewalls to form a duct, and means for releasably supporting the cover on the sidewalls. Where lateral flanges are provided as part of the releasable connection of the sidewalls, the flanges are turned into the interior of the duct.

The means for releasably supporting the cover on the channel includes a recess formed in one of the sidewalls, and an angle bracket which has a leg adapted to fit inside the recess. An adhesive securely fastens the angle bracket to the sidewall. The angle bracket also includes a second leg which extends from the sidewall so that, when the cover is placed on the channel, the upper surface of the second leg is substantially flush with the bottom of the cover. The upper surface of the second leg supports a suitable fastener, such as a velcro pad, which releasably fastens the cover to the leg.

In one embodiment of this invention, the upper surface of the second leg defines a pocket for locating and supporting the velcro pads. More than one pocket can be provided on the angle bracket to enhance the overall strength and uniformity of the support for the cover. The provision of a recess in the sidewall and a pocket in the upper surface of the angle bracket strengthens the support structure for the cover and, therefore, reduces maintenance of the support structure and the likelihood that the cover can fall from the duct accidentally.

This invention also includes means for retaining the cable in the channel when the cover is removed. In one embodiment of the invention, the means for retaining the cable inside the duct when the cover is removed includes a flange which extends laterally from one of the sidewalls and inwardly of the channel so that, when the cover is removed, the cable engages and is retained by the flange inside the channel.

Various other features and advantages of the invention will become apparent to those skilled in the art upon review of the following detailed description, claims and drawings.

DESCRIPTION OF THE DRAWINGS

FIG. 3 is a front elevational view of a cable enclosure incorporating the portion illustrated in FIG. 1.

FIG. 4 is a cross-sectional view of the cable enclosure illustrated in FIG. 3 and taken along line 4—4.

FIG. 5 is a cross-sectional view of the cable enclosure illustrated in FIG. 3 and taken along line 5—5.

FIG. 6 is an enlarged cross-sectional view of a portion the cable enclosure illustrated in FIG. 3 and taken along line 6—6.

FIG. 7 is a front elevational view of a cable enclosure incorporating the portion illustrated in FIG. 2.

FIG. 8 is an end view of the cable enclosure illustrated in FIG. 7.

FIG. 9 is a cross-sectional view of a portion of the cable enclosure illustrated in FIG. 8 and taken along line 9—9.

Figure 1:
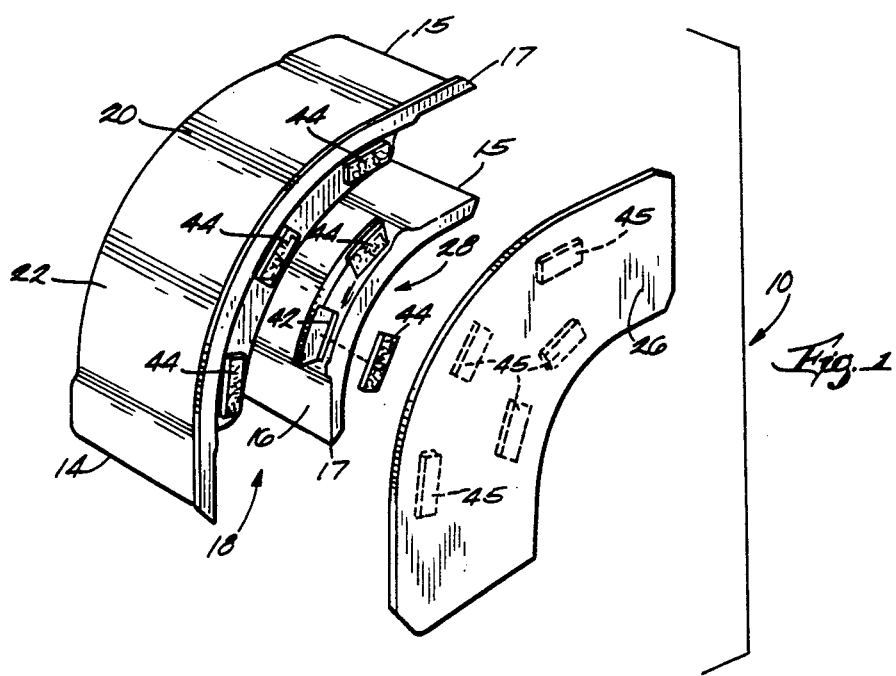
FIG. 1 is an exploded, perspective view of a portion of a cable enclosure embodying various features of the invention.
Figure 2:
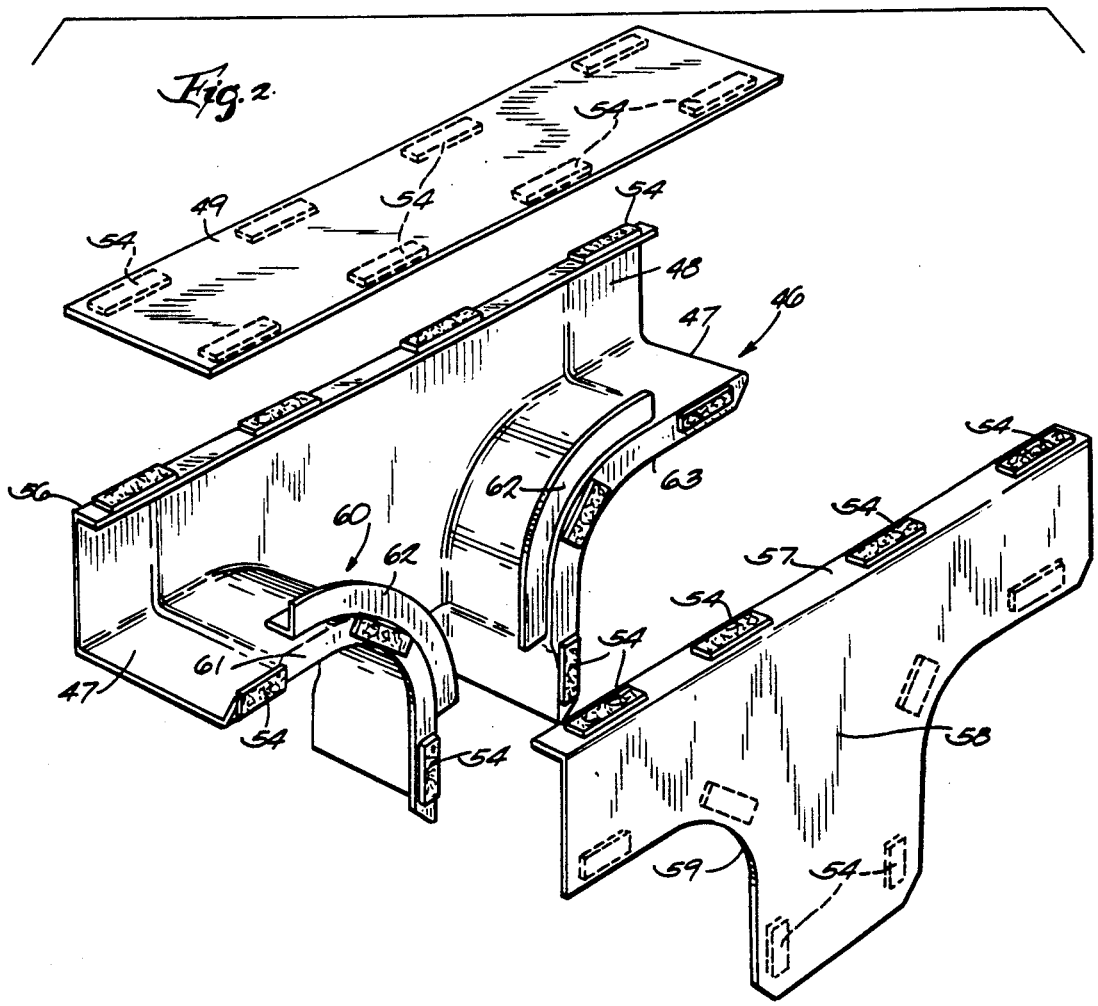
FIG. 2 is an exploded, perspective view of an alternative embodiment of a portion of a cable enclosure embodying various features of the invention.

Before embodiments of the invention are explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A portion of a communications network is illustrated in the drawings and includes an enclosure or duct 10 adapted to house fiber optic cable 12 or the like for protecting and guiding the cable along a path as a portion of a cable network. For the purposes of describing the duct 10, the cable need not be of any particular type and mention of fiber optics is by way of example only.

FIG. 1 illustrates an exploded, perspective view of a portion of a duct 10 including a channel 14 which is formed by two separate sidewalls 15 releasably joined together to define an inner surface 16 that form a generally U-shaped cross-sectional configuration (see FIGS. 4 and 5). The sidewalls have edges 17 turned laterally from the sidewalls and defining an open side 18. The portion of the duct 10 illustrated in FIG. 1 is a 90° elbow which has a curved portion 20 so that one of the sidewalls 22 defines an outer radius and another of the sidewalls 24 defines an inner radius. Preferably, the channel 14 is made of plastic, such as polyvinyl chloride, and can be produced by thermoforming.

The duct 10 also includes cover 26 which is configured to overlie the open side 18 of the channel 14 to totally enclose cables within the duct.

The duct 10 also includes means 28 for releasably supporting the cover 26 on the channel 14. The means 28 for releasably supporting the cover 26 includes, as shown in FIGS. 5 and 6, a pair of angle brackets 30 securely fastened to the inner surfaces 16 of the inner and outer sidewalls 22 and 24. Each of the angle brackets 30 has a first leg 32 which is rigidly secured to the inner surface of a respective one of the sidewalls 22 or 24, and a second leg 34 which extends from the first leg 32 inwardly of the channel 14 adjacent the edge 17 of the respective sidewall 22 or 24. More particularly, leg 34 extends laterally of the sidewalls 22 and 24, generally parallel to the connecting sidewall 15, and at the open side 18. Similarly, edges 17 have the same relation relative to the sidewalls 15 and at the open side 18, but are turned outwardly of the open side 18. Because the elbow includes a curved portion 20, the angle brackets 30 have a curved portion 35 configured to correspond to the respective radii defined by the sidewalls 22, 24. The angle bracket 30 located on the outer sidewall 22, with respect to the curve, has the legs 32 and 34 curved to follow the radius defined by the outer sidewall 22.

Similarly, the angle bracket 30 on the other or inner sidewall 24 has the legs 32 and 34 curved to follow the radius of the inner sidewall 24.

The means 28 also includes means defining a recess 36 located in the sidewalls 15. As shown in FIG. 6, the recess 36 is defined in the inner surface 16 of the inner sidewall 24 to mate with and securely hold the first leg 32 of the angle bracket 30 on the sidewall. In the illustrated embodiment, the recess 36 is formed in the sidewall 16 and includes a shoulder 38 against which the first leg 32 of the angle bracket 30 can be located, and is on the inner radius of the curved portion 20 of the duct 10. As mentioned above, the first leg 32 of the angle bracket 30 is curved so as to mate with the recess 36 defined by the inner sidewall 24. In the preferred embodiment, the angle bracket 30 is fastened to the sidewall 24 by means of an adhesive between the sidewall 24 and the first leg 32 of the angle bracket 30. The structure and arrangement is the same for both angle brackets 30, but only one will be described.

The means 28 includes the outer surface 40 of the second leg 34 of the angle bracket 30, i.e. the surface which is adjacent the cover 26 when the cover 26 overlies the top 18 of the channel 14. For reasons discussed below, the outer surface 40 of the second leg 34 defines therein at least one pocket 42 which is sized to receive a fastener. In the illustrated embodiment, the pocket 42 is formed to receive a velcro pad 44 which cooperates with an associated velcro pad 45 on the undersurface of the cover 14 to releasably fasten the cover 26 to the channel 14. Velcro pads are examples of surface contact adhesion members which can be used in this invention, the desired feature being that when the exposed surfaces are brought into contact, a connection is achieved but one which can be released by separating the two members. Other forms of surface contact adhesion means can be used.

In the embodiment of the duct 10 illustrated in FIG. 1, the outer surface 40 of the second leg 34 of the angle bracket 30 includes a pair of pockets 42 for receiving a velcro pad. Depending on the size of the angle bracket 30, however, more pockets 42 could be provided. The provision of pockets 42 for receiving the fasteners 44 enhances the secure attachment of the fasteners 44 to the angle bracket 30 and assures uniform strength in the fastening means to assure that the cover 26 remains fastened to the channel 14.

A T-connector 46 is illustrated in FIGS. 2 and 7-9. Where, for example, the network requires a bundle of cables to follow multiple paths, the bundle can be split and still be housed by the duct 10 at the split. Like the elbow portion, the T-connector 46 also includes three sidewalls 47, 48, and 49 defining a channel 50 having a U-shaped cross-sectional configuration and an open side 52. Unlike the elbow portion illustrated in FIG. 1, the sidewalls which form the channel 50 for the T-connector 46 are not integral. Rather, in the illustrated embodiment, two sidewalls 47 and 48 are integral and sidewall 49 is separate from those two. Velcro pads 54 are supported on inwardly turned flanges 56 which project laterally from sidewall 48. Velcro pads 54 are also provided on an inwardly turned flange 57 which projects laterally from cover 58. Sidewall 49 carries velcro pads 54 arranged to engage with those on flanges 56 and 57.

Cover 58 includes velcro pads 54 on its inner side 59 arranged to engage with velcro pads 54 on outwardly turned flanges 61 and 63.

With this arrangement, cover 58 is engaged with the pads 54 on flanges 61 and 63. With the cover in place, sidewall 49 is engaged with the pad flanges 56 and 57 to complete the duct enclosure.

As shown in FIGS. 7-9, the duct 10 also includes means 60 for retaining the cable 12 in the channel 50 when the cover 58 is removed from the channel 50. The retaining means 60 includes retaining flanges 62 which are fixed to the inner surfaces of a sidewall 47 and which extend inwardly of the channel 50 to engage the bundle or cable. In the illustrated T-connector 46, the retaining flanges 62 are disposed on the inner radius of the curved portion of the T-connector 46. The retaining flanges 62 extend inwardly of the channel 50 adjacent the open side 52 of the channel 50 and can engage the fiber optic cable 12 when the cover 58 of the duct is removed so as to retain the cable 12 in position within the duct 10 and to prevent its dislocation from the duct 10. Thus, the duct 10 provides an enclosure including means defining a channel 50 having an open side 52, means associated with the channel 50 for opening and closing the top 52, and means supported by the channel 50 for retaining the cable 12 in the channel 50 when the top 52 is open. It should also be noted that the in-turned flanges 56 and 57 will provide the same cable retention function depending upon the orientation of the duct (see FIG. 8).

The connection between the releasable wall sections of the duct, whether just separable wall sections or the designated cover section and the remainder of the wall sections, is made through the velcro pads. The pads are arranged on the wall sections in a predetermined pattern and the pads on the removable section, or designated cover, are arranged in an identical pattern. This provides an effective releasable connection.

When the duct is oriented so that the open side of the channel lies in a vertical plane, for example, the cable may be under tension due to gravity or due to being wrapped around a corner, and may in the absence of a retaining flange, tend to fall out of the channel when the cover is removed from the duct. Preferably, the extension of the retaining flange inwardly of the channel is sufficient to prevent the channel from rolling or sliding over the retaining flange, but provides sufficient clearance between the end of the retaining flange and the opposing sidewall to afford ready installation and maintenance of the cable.

The feature of turning the flanges inwardly at various areas of the ducts, results in a more compact duct than would be the case with flanges turned outwardly.

Various features of the invention are set forth in the following claims.

I claim:

1. A duct comprising, in combination, an interconnected wall extending in a closed path and defining an interior space adapted to receive therein wires, a portion of said wall being separable from the remainder of said wall and, when so separated, the remainder of said wall defining an opening into said interior space, first and second flanges supported in spaced relation on said wall and separate from said separable wall portion and adjacent said opening, said flanges projecting laterally from said wall into said interior space and including an elongated portion extending generally along said wall and having a generally planar surface, said first and second flanges each including a surface recessed from said planar surface in a predetermined pattern, at least two first adhesion members secured to said flanges and located in said recessed surfaces and including a selectively releasable contact adhesive facing outwardly of said recessed surfaces, at least two second adhesion members secured to said separate wall portion in a pattern corresponding to the predetermined pattern of said first adhesion members, said second adhesion members including selectively releasable means on the surface thereof facing away from said separable wall portion so that said separable wall portion is positionable over said opening with said first and second adhesion members in contact for releasably securing said separable wall portion to said wall at said opening.

2. The duct of claim 1 wherein said interconnected wall includes a plurality of pairs of opposed-facing, generally elongated sections which are relatively parallel and which are connected to form said interior space, and wherein said separable portion of said wall is one section of one of said opposed pairs of sections.

3. The duct of claim 1 wherein said flanges are in the form of angle brackets including first and second angularly related legs, wherein one of said angle bracket legs includes said recessed surface, wherein said wall includes recessed surfaces, and wherein the other of said bracket legs is attached to said recessed surfaces of said wall.

* * * * *